[19] United States Patent
Ashman et al.

[11] Patent Number: 4,648,688
[45] Date of Patent: Mar. 10, 1987

[54] CONNECTOR FOR FIBER OPTIC MEMBER INCLUDING POLISHING FIXTURE AND METHOD OF TERMINATING SAME

[75] Inventors: John J. Ashman; Bernard G. Caron, both of Harrisburg, Pa.

[73] Assignee: AMP Incorporated, Harrisburg, Pa.

[21] Appl. No.: 719,022

[22] Filed: Mar. 25, 1985

Related U.S. Application Data

[63] Continuation of Ser. No. 381,495, May 24, 1982.

[51] Int. Cl.[4] .......................... G02B 6/36; G02B 7/26; B24B 23/00
[52] U.S. Cl. .............................. 350/96.20; 350/96.10; 350/96.21; 350/96.18; 350/320; 51/170 T; 51/170 MT
[58] Field of Search ............... 350/96.10, 96.15, 96.16, 350/96.20, 96.21, 96.22, 320, 96.18; 51/3, 4, 102, 103 R, 104, 105 R, 106 R, 128, 129, 132, 209 R, 210, 283 R, 170 T, 219 R, DIG. 10, 170 MT

[56] References Cited

U.S. PATENT DOCUMENTS

| | | | |
|---|---|---|---|
| 3,649,098 | 3/1972 | Suverison | 350/96.18 |
| 3,975,865 | 8/1976 | Lewis | 51/170 T |
| 3,981,422 | 9/1976 | Moore | 225/2 |
| 3,989,567 | 11/1976 | Tardy | 350/96.21 |
| 3,999,837 | 12/1976 | Bowen et al. | 350/96.22 |
| 4,019,241 | 4/1977 | Logan | 350/96.20 |
| 4,047,796 | 9/1977 | Kao et al. | 350/96.20 |
| 4,050,781 | 9/1977 | Beauhaire | 350/96.20 |
| 4,061,416 | 12/1977 | Stewart | 350/96.20 |
| 4,148,557 | 4/1979 | Garvey | 350/96.20 |
| 4,161,347 | 7/1979 | Tardy | 350/96.21 |
| 4,186,996 | 2/1980 | Bowen et al. | 350/96.2 |
| 4,300,815 | 11/1981 | Malsot et al. | 350/96.20 |
| 4,362,356 | 12/1982 | Williams et al. | 350/96.20 |
| 4,370,022 | 1/1983 | Johnson | 350/96.21 |
| 4,436,366 | 3/1984 | Abramson | 350/96.20 |
| 4,447,121 | 5/1984 | Cooper et al. | 350/96.20 |
| 4,486,072 | 11/1984 | Roberts | 350/96.21 |
| 4,510,005 | 4/1985 | Nijman | 156/221 |

FOREIGN PATENT DOCUMENTS

| | | | |
|---|---|---|---|
| 2943180 | 5/1981 | Fed. Rep. of Germany | 350/96.20 |
| 55-115009 | 9/1980 | Japan | 350/96.20 |

Primary Examiner—William L. Sikes
Assistant Examiner—Brian M. Healy
Attorney, Agent, or Firm—Adrian J. LaRue; Anton P. Ness

[57] ABSTRACT

A connector for a fiber optic member comprises a ferrule member in which is positioned an insert having rods surrounding a section of an exposed end of the fiber optic member, the exposed end extending along a front bore of the ferrule member. A crimping ferrule on the ferrule member is controllably crimped thereon thereby moving the rods into mechanical engagement with the fiber optic member with no or minimum deformation to the fiber optic member and securing the fiber optic member in the ferrule member.

34 Claims, 11 Drawing Figures

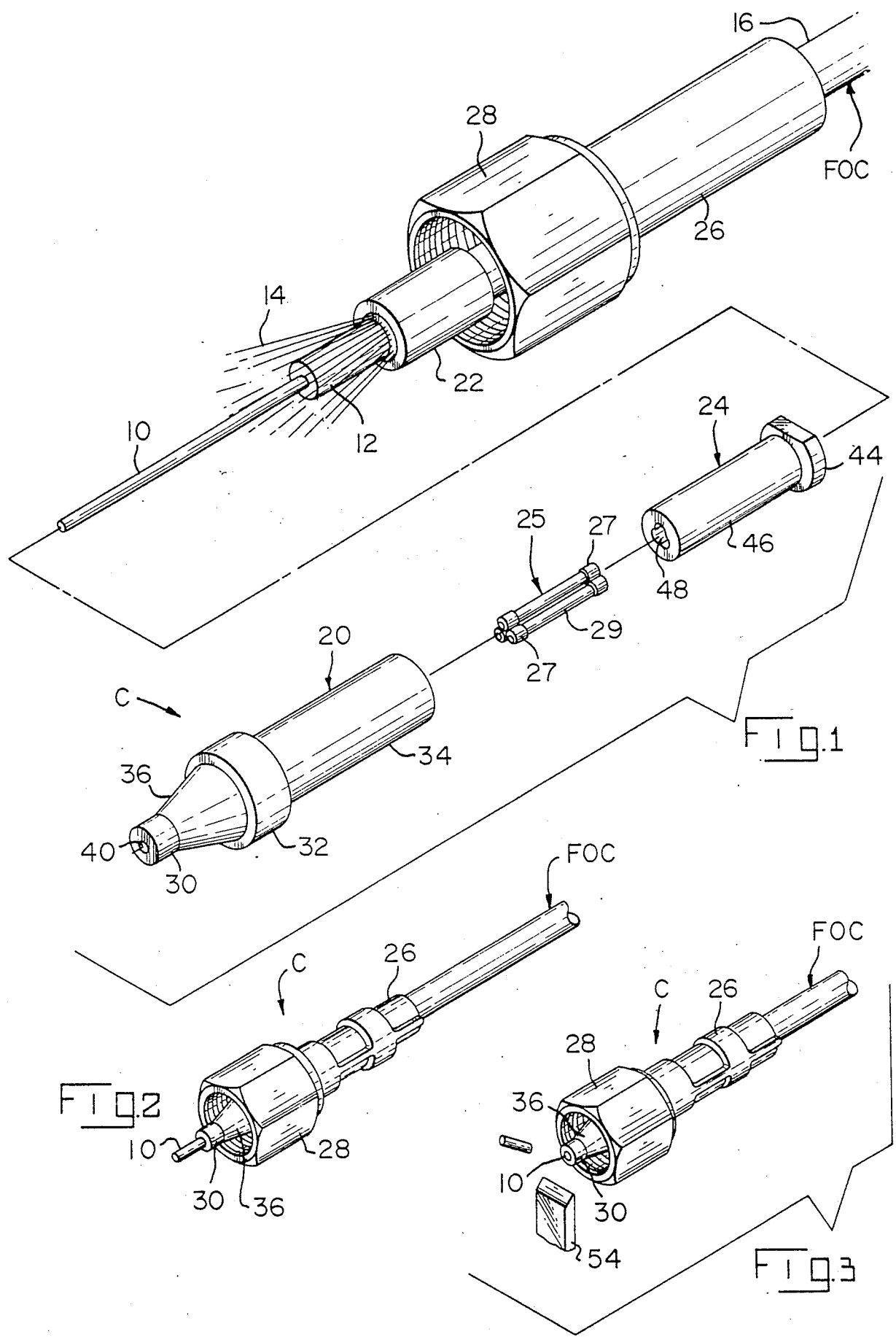

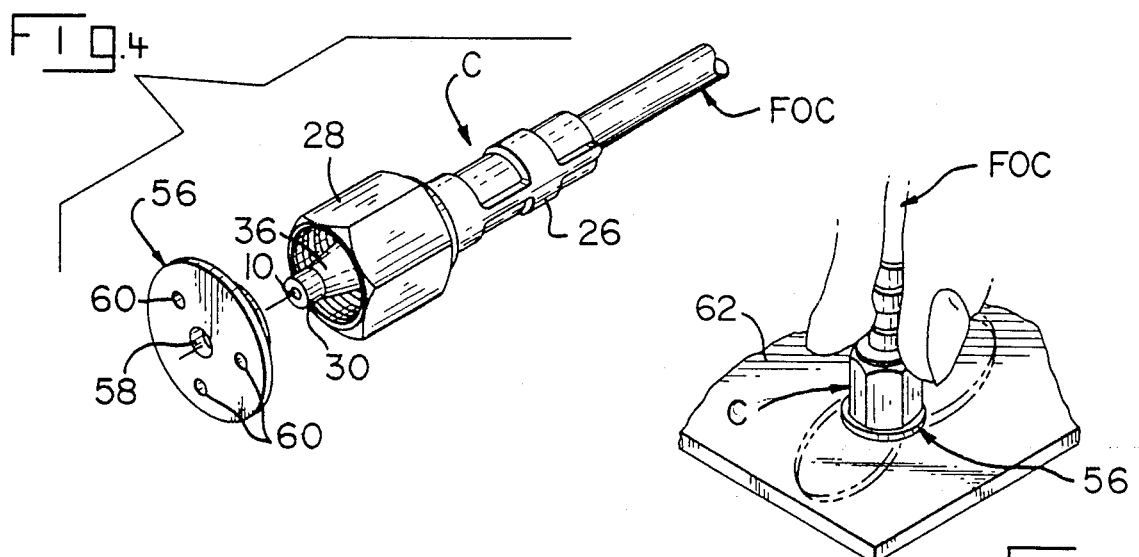
Fig.4
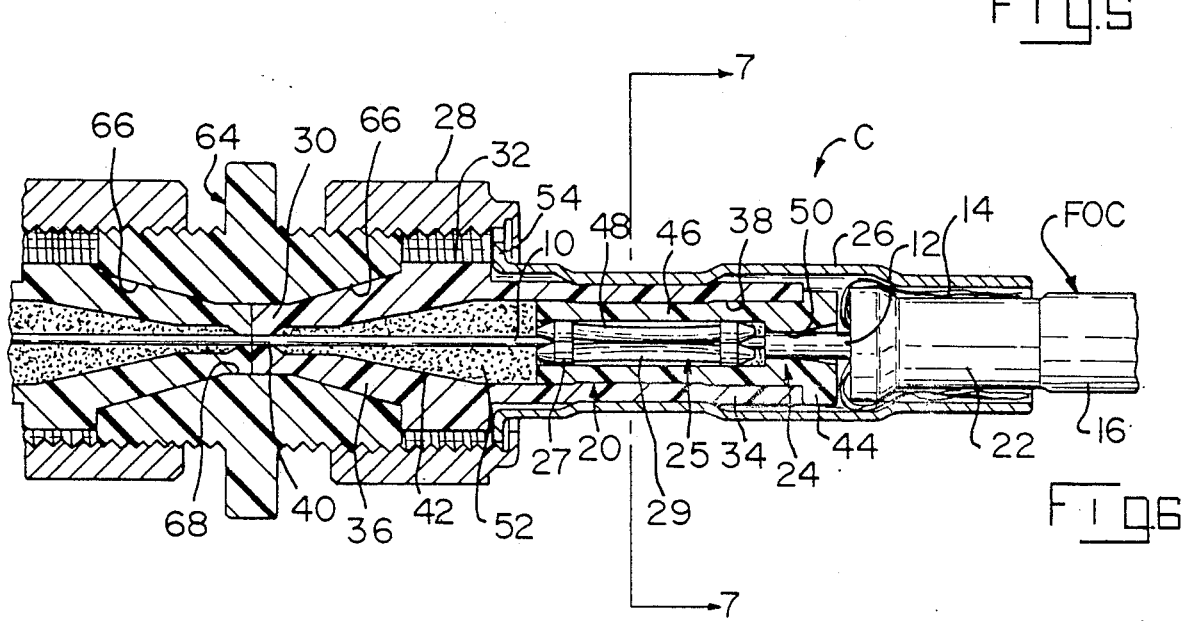
Fig.5
Fig.6
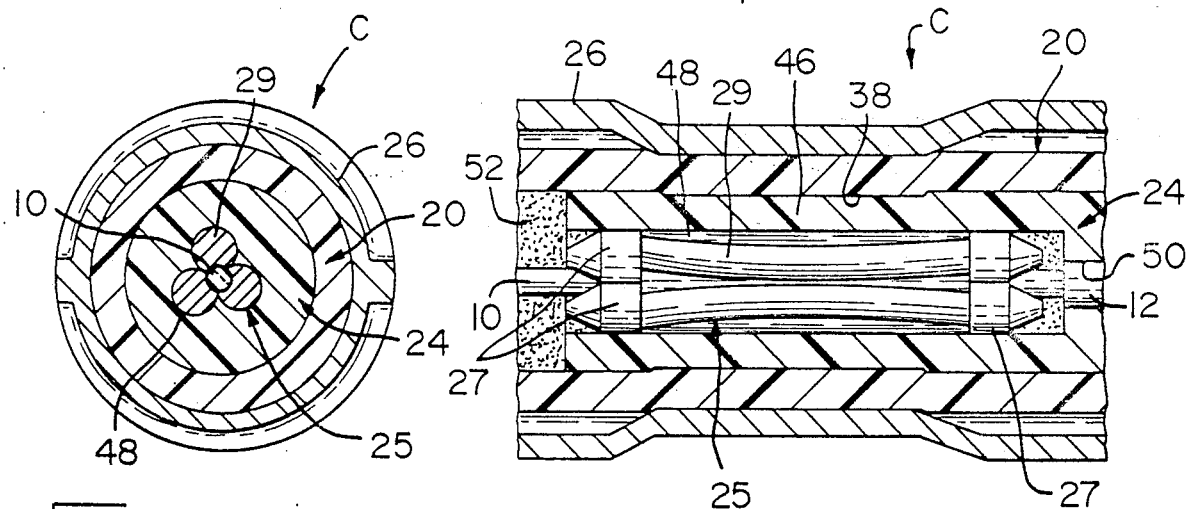
Fig.7
Fig.8

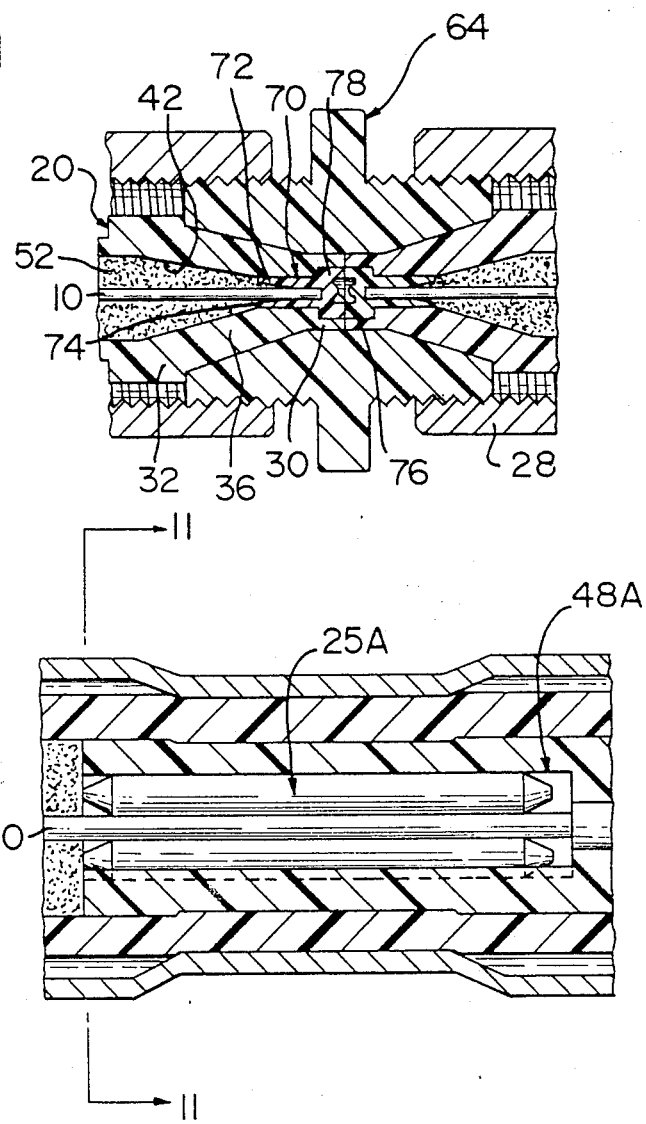
Fig. 9
Fig. 10
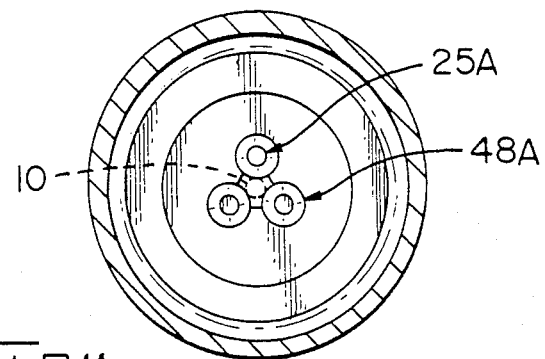
Fig. 11

CONNECTOR FOR FIBER OPTIC MEMBER INCLUDING POLISHING FIXTURE AND METHOD OF TERMINATING SAME

This application is a continuation of application Ser. No. 381,495 filed May 24, 1982.

FIELD OF THE INVENTION

This invention relates to a connector for a fiber optic member and includes an insert having rods surrounding an exposed end of the fiber optic member and is positioned within a ferrule opening with sections of the rods being moved into engagement with a section of the exposed fiber optic member when a crimping ring on the ferrule is crimped thereon.

BACKGROUND OF THE INVENTION

U.S. Pat. No. 3,999,837 discloses a connector for a fiber optic member which includes a ferrule in which the fiber optic member and protective jacket thereon is disposed with an exposed end of the fiber optic member extending along a front bore. Potting material is applied onto the exposed fiber optic member before or after the fiber optic member is inserted into the ferrule. The potting material begins to cure thereby partly retaining the fiber optic member in the ferrule while the crimping ring is crimped onto the ferrule which holds the parts in place while the potting material fully cures.

The uses of potting material secures the fiber optic member in the ferrule, but it is messy, it is an extra step, and it takes time to cure. This is undesirable when terminations of fiber optic members need to be done at remote locations in the field and they need to be done quickly and easily.

An insert being positioned onto the buffer material covering the fiber optic member is disclosed in U.S. Pat. No. 4,447,121. The insert is placed in a ferrule and a crimping ferrule is crimped onto the ferrule which causes a fiber-engaging section of the insert to be reduced in diameter thereby secured onto the buffer material. This approach was effective for the buffer material in use at the time. The buffer material in current use is too soft and does not have the characteristics to enable an insert to be crimped thereon to effectively terminate an end of a fiber optic member.

SUMMARY OF THE INVENTION

According to the present invention, a connector for a fiber optic member comprises a ferrule member in which is positioned an insert having rods surrounding a section of an exposed end of the fiber optic member, the exposed end extending along a front bore of the ferrule member. A crimping ferrule on the ferrule member is controllably crimped thereon thereby moving rods into mechanical engagement with the fiber optic member with no or minimum deformation to the fiber optic member and securing the fiber optic member in the ferrule member.

According to another aspect of the present invention, the fiber optic member with buffer material thereover can be encased in an inner jacket having strength members covering the inner jacket and an outer jacket thereover which constitutes a fiber optic cable for use in telecommunications, data processing, or other electronic applications. An outer crimping ferrule is then used to crimp the strength members onto the ferrule member adjacent the crimping ferrule and to crimp onto the outer jacket to terminate the fiber optic cable for joining ends of such cable together or for connecting the cable to a light-transmitting or sensing member.

According to a further aspect of the present invention, a method of applying a connector to an end of a fiber optic member comprises the steps of placing a connector assembly onto an exposed end of the fiber optic member, controllably crimping the crimping ferrule thereby reducing the ferrule member and moving the sections of the rods into engagement with the fiber optic member whereby the fiber optic member is secured within the ferrule member.

BRIEF DESCRIPTION OF THE DRAWINGS

FIG. 1 is a perspective exploded view of the connector and the fiber optic cable.

FIG. 2 is a view of FIG. 1 showing the connector fully crimped onto the fiber optic cable.

FIG. 3 is a view similar to FIG. 2 showing the end of the fiber optic member being removed.

FIG. 4 is a view similar to FIG. 3 showing a compressing and polishing fixture exploded therefrom.

FIG. 5 is a perspective view showing the polishing of the end of the fiber optic member.

FIG. 6 is a longitudinal section view of a splice connector for fiber optic cables using the connector of the present invention.

FIG. 7 is a cross-sectional view taken along line 7—7 of FIG. 6.

FIG. 8 is a longitudinal section view along the crimped area of the connector showing the engagement of the rods onto a section of the exposed fiber optic member.

FIG. 9 is a view similar to that of FIG. 8 showing an alternative embodiment.

FIG. 10 is a part longitudinal section view similar to that of FIG. 8 showing a further embodiment.

FIG. 11 is a view taken along line 11—11 of FIG. 10 prior to crimping.

DETAILED DESCRIPTION OF PREFERRED EMBODIMENTS

FIGS. 1 through 8 illustrate a connector C for terminating a fiber optic cable FOC. The fiber optic cable FOC includes a fiber optic member 10 which includes a core or light-transmitting member surrounded by cladding material to enable light to be transmitted therealong. An inner jacket 12 of plastic material surrounds a buffer material which covers fiber optic member 10 and lends strength to the cable to prevent the core or light-transmitting member from being broken since it can be made from glass or plastic material. Strength members 14 of plastic material or metal extend along inner jacket 12 to lend further strength to the cable and provide tensile strength thereto. An outer jacket 16 protects the entire cable assembly. The fiber optic cable FOC is stripped as illustrated in FIG. 1 to expose a length of strength members 14, inner jacket 12, and fiber optic member 10 to enable the stripped fiber optic cable to be terminated onto connector C.

Connector C includes a ferrule member 20, a metal ring 22, an insert 24, rods 25, and a crimping ferrule 26 on which is captured a threaded nut 28.

Ferrule member 20 is made from a suitable plastic material having resilient characteristics and preferably fabricated by molding. Ferrule member 20 is of the type disclosed in U.S. Pat. No. 3,999,837, the disclosure of which is completely incorporated herein by reference.

It has a front cylindrical section 30, a central cylindrical section 32, and a rear cylindrical section 34, each of the cylindrical sections having a different diameter as can be discerned. A conical section 36 extends between sections 30 and 32. A rear bore 38 extends through section 34. A front bore 40 extends through front cylindrical section 30 and has a diameter to receive fiber optic member 10 therethrough, whereas rear bore 38 has a diameter to receive insert 24 therein. Conical section 36 has a conical bore 42 extending between bores 38 and 40.

Insert 24 is molded from a suitable plastic material and includes a flange 44 and a cylindrical section 46. A rod-receiving bore 48 having a trifoliate configuration extends through insert 24 to circular bore 50 having a beveled entrance to accommodate fiber optic transmission member 10 of the fiber optic cable FOC. The axes of the trifoliate sections of bore 48 are located at 120° intervals and they respectively receive therein a fiber-engaging means, which is rods 25.

Rods 25 as shown by FIGS. 1, 6 and 8 are dumbbell shaped so that ends 27 engage one another when rods 25 are inserted into the respective trifoliate sections of bore 48 thereby maintaining circular sections 29 spaced from one another parallel to the axis of bore 48 to enable fiber optic member 10 to be threaded therethrough. The ends of ends 27 are tapered to facilitate insertion of rods 25 within the trifoliate sections as well as to facilitate passage of fiber optic member 10 therealong. Rods 25 are press fit into the trifoliate sections of bore 48 so that ends 27 frictionally maintain rods 25 within the trifoliate sections. Rods 25 are used for fiber optic members having diameters of 125 to 140 microns.

The triangular-shaped fiber-receiving opening formed by the engagement of ends 27 when rods 25 are in position in the trifoliate sections of bore 48 is large enough to enable fiber optic member 10 to pass through rods 25 prior to being crimped onto fiber optic member 10. For larger diameter fiber optic members, rods 25A, as shown in FIG. 10, have the same diameter therealong with the ends tapered for the reasons that ends 27 are tapered. Rods 25A, as shown in FIG. 11, are frictionally held in position in the trifoliate sections of bore 48A prior to being crimped onto fiber optic member 10 to enable the fiber optic member to move freely therealong. Rods 25 and 25A are formed of a material softer than that of fiber optic member 10.

To terminate fiber optic cable FOC by a connector C, the fiber optic cable is stripped as illustrated in FIG. 1 to expose strength members 14, inner jacket 12, and fiber optic member 10.

Connector C is in an assembled condition with a commercially-available moisture resistant and protective resin 52 in the conical bore 42 and part of bore 38 of ferrule member 20; insert 24 with rods 25 or 25A in position in the trifoliate sections of bore 48 is in bore 38 with flange 44 engaging the end of ferrule member 20; and crimping ferrule 26 with threaded nut 28 thereon is positioned on section 34 with the flared section disposed adjacent section 32 of ferrule member 20.

Connector C in its assembled condition is ready to be positioned on the stripped end of the fiber optic cable and to be terminated thereon according to the following procedure. Resin 52 is viscous over a wide temperature range; thus it will not run out of the ferrule member. Resin 52 protects the fiber optic member 10 from moisture and from becoming brittle.

Metal ring 22 is placed on the end of outer jacket 16, the stripped end of fiber optic cable FOC is inserted into the assembled connector C with fiber optic member 10 extending through the triangular-shaped opening of rods 25, 25A, resin 52, bore 40 with an end of fiber optic member 10 extending beyond the end of section 30 as shown in FIG. 2. Strength members 16 fold back over metal ring 22.

A conventional crimping tool (not shown) is positioned onto crimping ferrule 26 over metal ring 22 and the crimping tool is controllably operated to crimp this section of crimping ferrule 26 onto strength members 14 and metal ring 22. This reduces metal ring 22 causing it to be crimped onto outer jacket 16 and strength members 14 are captured between metal ring 22 and crimping ferrule 26. This provides a strain relief for the termination.

The crimping tool is next placed on crimping ferrule 26 over the rods and controllably operated to crimp crimping ferrule 26 onto section 34 of ferrule member 20 and move at least central parts of the rods into engagement with the section of fiber optic member 10 therealong.

In the case of rods 25, during the crimping action, central parts of sections 29 are first moved into engagement with the fiber optic member 10 causing the central parts of sections 29 to be deformed in cross-section because the material of rods 25 is softer than the fiber optic member, and then the central parts of sections 29 engage each other in the last stage of the crimping operation causing cross-sectional deformation thereof. Very minimal deformation of the fiber optic member takes place when the central parts of sections 29 are crimped onto the fiber optic member 10 thereby causing no appreciable degradation of the light-transmitting characteristics of the fiber optic member. This also results in an effective mechanical termination of the fiber optic member. Sections 29 in their final crimped configurations are slightly arcuate shaped as shown in FIG. 8.

In the case of rods 25A as shown in FIG. 10, they are crimped onto fiber optic member 10 in the same manner as sections 29 of rods 25 except that the entire lengths of rods 25A with the exception of the tapered ends are crimped into engagement with the fiber optic member thereby mechanically securing the fiber optic member in position in the connector.

Upon conclusion of crimping connector C onto fiber optic cable FOC with an end of fiber optic member 10 extending outwardly from the end of section 30 as shown in FIG. 2, a scribing tool 54 is used as shown in FIG. 3 to scribe the fiber optic member along the end of section 30, if it is glass, and then the end of the fiber optic member is broken free of the fiber optic member. If the fiber optic member 10 is plastic, it will be cleaved by a suitable cleaving tool.

A compression and polishing fixture 56, as shown in FIG. 4, is threadably secured onto connector C with sections 30 and 36 mated within a profiled bore 58 of fixture 56; bore 58 has the same configurations as that of sections 30 and 36 except that they are dimensioned to compress section 30 into tight engagement with the fiber optic member 10 in bore 40 and a slight part of section 30 extends beyond the outer surface of fixture 56 when fixture 56 is threaded onto connector C. Buttons 60 extend outwardly from the outer surface of fixture 56.

Connector C with fixture 56 thereon is now subjected to a polishing action by moving fixture 56 in a figure eight configuration along a polishing film 62 of very fine silicon carbide or aluminum oxide grit as shown in FIG. 5 for a period of time. Buttons 60 stabilize the polishing and, when they are worn away, the end of section 30 along with the end of fiber optic member 10 are polished and are in the same plane. Fixture 56 is removed from connector C and connector C is now properly and completely terminated on fiber optic cable FOC.

After ends of the fiber optic cable have been terminated by connectors C, the connectors can be secured onto a coupling bushing 64 as shown in FIG. 6. The bore of coupling bushing 64 has identical conical bores 66 leading to a central cylindrical bore 68. When threaded nuts 28 of connectors C threadably engage coupling bushing 64, bores 66 engage conical sections 36 of ferrule members 20 to radially compress these sections of the ferrule members 20 thereby causing resilient radial deformation thereof which biases the fiber optic member to a stable position within central cylindrical bore 60 which will align fiber optic members 10 therein. The radial compression of two similar resilient ferrule members within a commonly shaped bore 60 will bias corresponding light-transmitting members or cores 10 into coincident alignment even though the cladding layers over the light transmission members or cores are of different diameters. Connector C of a terminated fiber optic cable can also be connected with a light-transmitting or light-sensing member in the manner disclosed in U.S. Pat. No. 4,186,996.

An alternative embodiment is shown in FIG. 9 wherein a lens member 70 is secured in sections 30 and 36 of ferrule member 20. Section 72 of lens member 70 has a conical bore 74 in communication with bore 42 and terminating adjacent lens section 76 which is surrounded by an annular section 78. Fiber optic member has to be trimmed to proper length to abut against the end of bore 74 which also guides the end of the fiber optic member into lens member 70. No removing of an exposed end of the fiber optic member and of polishing the end of the connector as shown in FIGS. 3 through 5 is necessary when the connector of FIG. 9 is used. Lens member 70 will collimate the light transmitted along fiber optic member 10 and annular sections 78 will engage when the connectors are coupled in coupling bushing 64. Resin 52 will protect the exposed fiber optic member as hereinabove set forth.

We claim:

1. A polishing fixture for polishing a front end of a ferrule member and a front end of a fiber optic transmission member secured in a bore of the ferrule member, comprising:

a body member having a front flat surface and a profiled bore extending therethrough in which a profiled front end of the ferrule member is to be disposed with a front surface of the ferrule member extending outwardly beyond said front flat surface, said profiled bore being dimensioned to compress a front section of the ferrule member in tight engagement with the fiber optic transmission member in the bore of the ferrule member;

means for securing the ferrule member to said body member; and means on said front flat surface to stabilize polishing of the front surface of the ferrule member and the front end of the fiber optic transmission member when the body member with said front section of said ferrule member secured therein is held against a polishing film and moved with respect thereto during the polishing thereof and to control the polishing so that the front surface of the ferrule member and the front end of the fiber optic transmission member are polished and are in the same plane.

2. A polishing fixture as set forth in claim 1, wherein said stabilizing and controlling means are buttons that extend outwardly from the front flat surface and are worn away during the polishing of the front surface of the ferrule member and the front end of the fiber optic transmission member indicating that said front surface of the ferrule member and said front end of the fiber optic transmission member are polished and are in the same plane.

3. A connector for terminating a fiber optic member, comprising an insert member having a bore means extending therethrough, a ferrule member including a front section and a rear section and having an opening extending therethrough including front and rear bores in said front and rear sections respectively, and a crimping ferrule around said rear section of the ferrule member, said insert member receiving a fiber optic member insertably therethrough such that an end portion of said fiber optic member is spaced forwardly from said insert member with said fiber optic member therethrough being insertable into said opening of said ferrule member such that said end portion of said fiber optic member is disposable in said front bore of said ferrule member and said insert member is disposable in said rear bore in said rear section such that said fiber-engaging means of said insert member is positionable under said crimping ferrule, and said crimping ferrule is adapted to be controllably crimped to said rear section of said ferrule member simultaneously crimping said fiber-engaging means to said fiber optic member and crimping said ferrule member to said insert member thus terminating said fiber optic member, characterized in that:

said bore means of said insert member is a rod-receiving bore means, said fiber-engaging means comprises a plurality of rod members contained in said rod-receiving bore means of said insert member and having a fiber-receiving opening therebetween, and at least central portions of said rod members are crimpable into securing engagement with said fiber optic member extending through said fiber-receiving opening.

4. A connector as set forth in claim 3 further characterized in that the material of said rod members is softer than the fiber optic member.

5. A connector as set forth in claim 4 further characterized in that said at least central portions of said rod members are deformed in cross-section during said crimping around said fiber optic member therebetween and are further deformed in cross-section where said rod members engage each other.

6. A connector as set forth in claim 3 further characterized in that said rod members are press fit into and frictionally held by said rod-receiving bore means prior to crimping.

7. A connector as set forth in claim 3 further characterized in that said rod-receiving bore means has a trifoliate configuration and said rod members are dumbbell shaped.

8. A connector as set forth in claim 7 further characterized in that said rod members are press fit into and frictionally held by said rod-receiving bore means prior to crimping.

9. A connector as set forth in claim 3 further characterized in that said rod-receiving bore has a trifoliate configuration and said rod members have a continuous diameter.

10. A connector as set forth in claim 9 further characterized in that said rod members are press fit into and frictionally held by said rod-receiving bore means prior to crimping.

11. A connector as set forth in claim 3 further characterized in that said fiber optic member is part of a fiber optic cable having strength members and an outer jacket, a metal ring positioned along said outer jacket and over which said strength members are positioned, said crimping ferrule extending along said metal ring and being controllably crimpable onto said metal ring in the area of said strength members to secure the strength members between the crimping ferrule and the metal ring to provide strain relief between said connector and said fiber optic cable.

12. A connector as set forth in claim 2 further characterized in that the end surface of said fiber optic member is in the same plane as the front surface of said ferrule member.

13. A connector as set forth in claim 3 further characterized in that said ferrule member comprises a front cylindrical section, a central cylindrical section, a rear cylindrical section, and a conical section extending between said front and central cylindrical sections.

14. A connector as set forth in claim 3 further characterized in that a protective viscuous material is located in said ferrule member to protect the exposed end of the fiber optic member.

15. A connector as set forth in claim 3 further characterized in that a lens member is secured in said ferrule member with the end of the fiber optic member disposed therein.

16. A connector for terminating a fiber optic cable means comprising:
    ferrule means having a front section and a rear section, said ferrule means having an opening extending therethrough including a front bore extending through said front section and a rear bore extending through said rear section;
    insert means having a rod-receiving bore means extending therethrough in which a plurality of rod means are positioned, said plurality of rod means having a fiber-receiving opening therebetween to enable a fiber optic member of a fiber optic cable means to be inserted between said rod means such that an end portion of said fiber optic member is spaced forwardly from said insert means, said insert means with a section of the fiber optic member therewithin being positionable in said opening of said ferrule means with said end portion of said fiber optic member being disposed along said front bore and said insert means being disposed along said rear bore in said rear section of said ferrule means; and
    crimping ferrule means on said rear section being controllably crimpable thereonto thereby reducing said rear section under said crimping ferrule means and moving at least central portions of said rod means in said insert means thereunder into securing engagement with the section of the fiber optic member thereunder thereby securing the insert means to the fiber optic member and the ferrule means to the insert means.

17. A connector as set forth in claim 16 wherein the material of said rod means is softer than the fiber optic member.

18. A connector as set forth in claim 17 wherein said at least central portions of said rod means are deformed in cross-section during said crimping around said fiber optic member therebetween and are further deformed in cross-section where said rod means engage each other.

19. A connector as set forth in claim 16 wherein said rod means are press fit into and frictionally held by said rod-receiving bore means prior to crimping.

20. A connector as set forth in claim 16 wherein said insert means includes a cylindrical section, said rod-receiving bore means having a trifoliate configuration with said rod means positioned in said bore means in said cylindrical section.

21. A connector as set forth in claim 20 wherein said rod means are dumbbell shaped.

22. A connector as set forth in claim 21 wherein said rod means are press fit into and frictionally held by said rod-receiving bore means prior to crimping.

23. A connector as set forth in claim 20 wherein said rod means have a continuous diameter.

24. A connector as set forth in claim 23 wherein said rod means are press fit into and frictionally held by said rod-receiving bore means prior to crimping.

25. A connector as set forth in claim 16 further comprising ring means positionable along an outer jacket of said fiber optic cable means, said crimping ferrule means controllably crimpable onto said ring means and strength means of the fiber optic cable means.

26. A connector as set forth in claim 16 wherein said opening through said ferrule means includes a conical bore extending between said front and rear bores and a viscous protective material is disposed in said opening.

27. A connector as set forth in claim 16 wherein an end surface of the end portion of the fiber optic member is coincident with a front surface of said front section.

28. A connector as set forth in claim 16 wherein said ferrule means is resilient.

29. A connector as set forth in claim 16 wherein lens means is secured in said front bore and an end of the fiber optic member is disposed in said lens means.

30. A method of terminating a connector onto an end of fiber optic cable means, characterized by the steps of:
    placing an insert member having rod members there in and a fiber-receiving opening between said rod members onto a section of a fiber optic member of the fiber optic cable means with an end portion of the fiber optic member spaced forwardly therefrom;
    inserting said insert member with the section of the fiber optic member therein into an opening of a ferrule member with the end portion of the fiber optic member disposed in a front section of said opening and said insert member disposed in a rear section of said ferrule member; and
    controllably crimping a crimping ferrule on said rear section of said ferrule member thereby reducing said rear section and moving the rod members in said insert member thereunder into securing engagement with the section of the fiber optic member which secures the fiber optic member in said insert member and said insert member in said ferrule member.

31. A method as set forth in claim 30 further characterized by the further step of scribing and breaking or cleaving the end of the fiber optic member extending out from a front surface of said ferrule member, at said front surface.

32. A method as set forth in claim 31 further characterized by the further steps of placing the ferrule member in a fixture with a slight section of said front surface extending beyond an outer surface of said fixture; and moving said fixture along a polishing film thereby polishing the end of the fiber optic means.

33. A method as set forth in claim 30 further characterized by the further step of positioning a ring member along an outer jacket of the fiber optic cable means with strength means of the fiber optic cable means being positioned on the ring member and controllably crimping said crimping ferrule onto the strength means and said ring member thereby securing said crimping ferrule onto said ring member with the strength means therebetween.

34. A method as set forth in claim 30 further characterized in that said rod members are press fit into and frictionally held by said insert member prior to said placing step.

* * * * *